Figure 1:
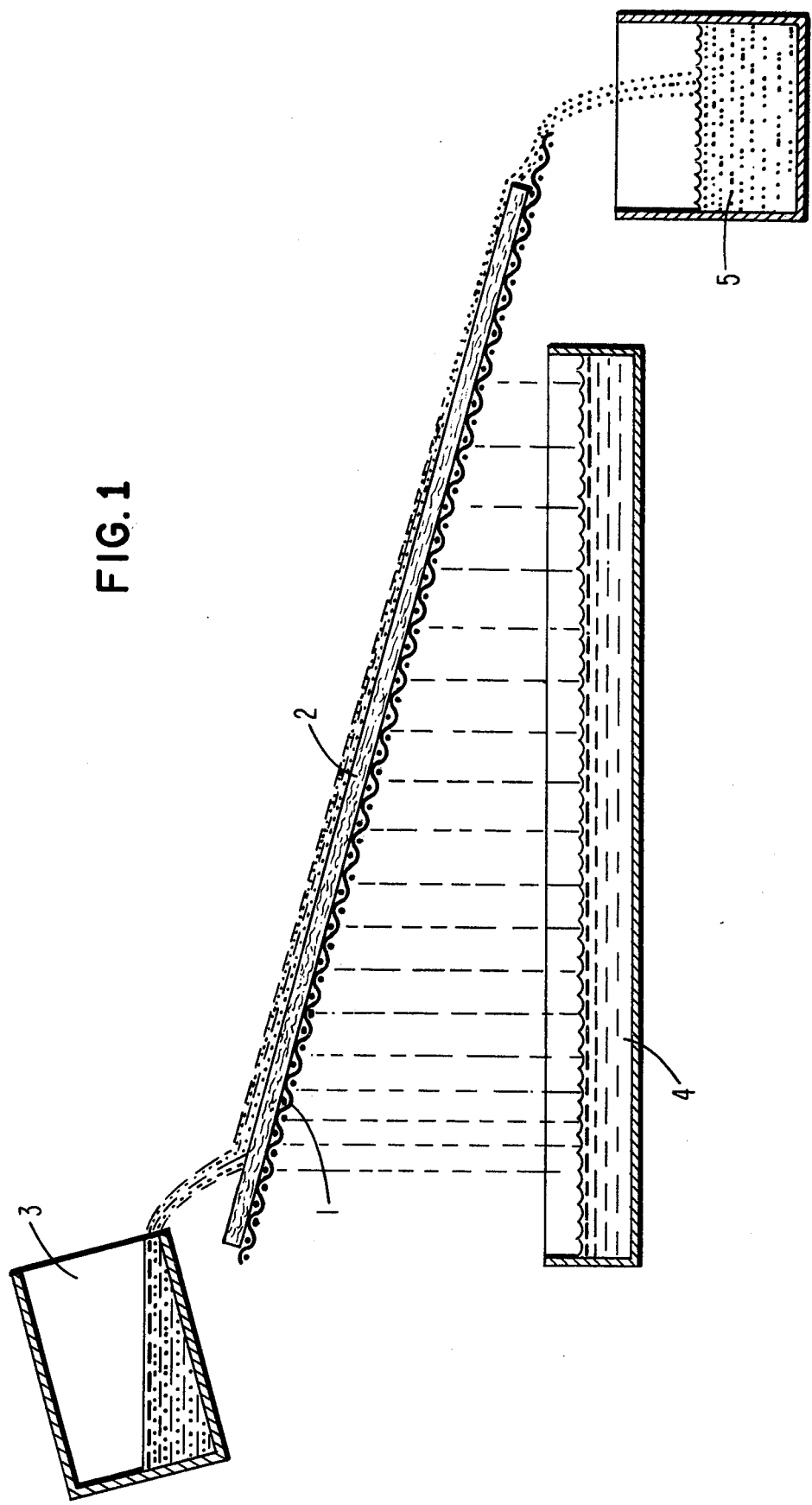

United States Patent [19]

Mathes et al.

[11] 4,371,441

[45] Feb. 1, 1983

[54] PROCESS AND APPARATUS FOR THE SEPARATION OF IMMISCIBLE LIQUID MIXTURES

[75] Inventors: Nikolaus Mathes, Breuberg; Hans J. Pitowski, Miltenberg, both of Fed. Rep. of Germany; Gunther Vitzthum, Enka, N.C.

[73] Assignee: Akzona Incorporated, Asheville, N.C.

[21] Appl. No.: 231,090

[22] Filed: Feb. 3, 1981

Related U.S. Application Data

[63] Continuation of Ser. No. 107,956, Dec. 28, 1979, abandoned, which is a continuation of Ser. No. 870,257, Jan. 17, 1978, abandoned.

[30] Foreign Application Priority Data

Jan. 18, 1977 [DE] Fed. Rep. of Germany ....... 2701759

[51] Int. Cl.$^3$ ............................................. B01D 17/02
[52] U.S. Cl. .................................. 210/649; 210/799; 210/503; 210/924; 162/146
[58] Field of Search ................ 162/146; 210/649, 242, 210/433, 455, 483, 484, 497, 500, 503, 538, 540, DIG. 5, 799, 924

[56] References Cited

U.S. PATENT DOCUMENTS

| 2,463,814 | 3/1949 | Skinner | 210/433 R |
|---|---|---|---|
| 3,271,237 | 9/1966 | Sommer et al. | 162/146 |
| 3,394,047 | 7/1968 | Sommer et al. | 162/146 |
| 3,537,587 | 11/1970 | Kain | 210/242 S |
| 3,667,608 | 6/1972 | Burroughs et al. | 210/DIG. 26 |
| 3,669,275 | 6/1972 | Downs | 210/DIG. 26 |

FOREIGN PATENT DOCUMENTS

| 657715 | 9/1951 | United Kingdom . |
|---|---|---|
| 843164 | 8/1960 | United Kingdom . |
| 847222 | 9/1960 | United Kingdom . |
| 1287153 | 8/1972 | United Kingdom . |
| 1326227 | 8/1973 | United Kingdom . |
| 1330339 | 9/1973 | United Kingdom . |
| 1396397 | 6/1975 | United Kingdom . |
| 1422405 | 1/1976 | United Kingdom . |
| 1442219 | 7/1976 | United Kingdom . |

Primary Examiner—Ferris H. Lander
Attorney, Agent, or Firm—Francis W. Young; Jack H. Hall

[57] ABSTRACT

Process and apparatus for the separation of mixtures of liquids insoluble in each other, e.g., water and oil, where the mixture of liquids is brought into contact, from one side, with a fabric allowing only one of the liquids to pass so that the liquids can be collected separately.

2 Claims, 3 Drawing Figures

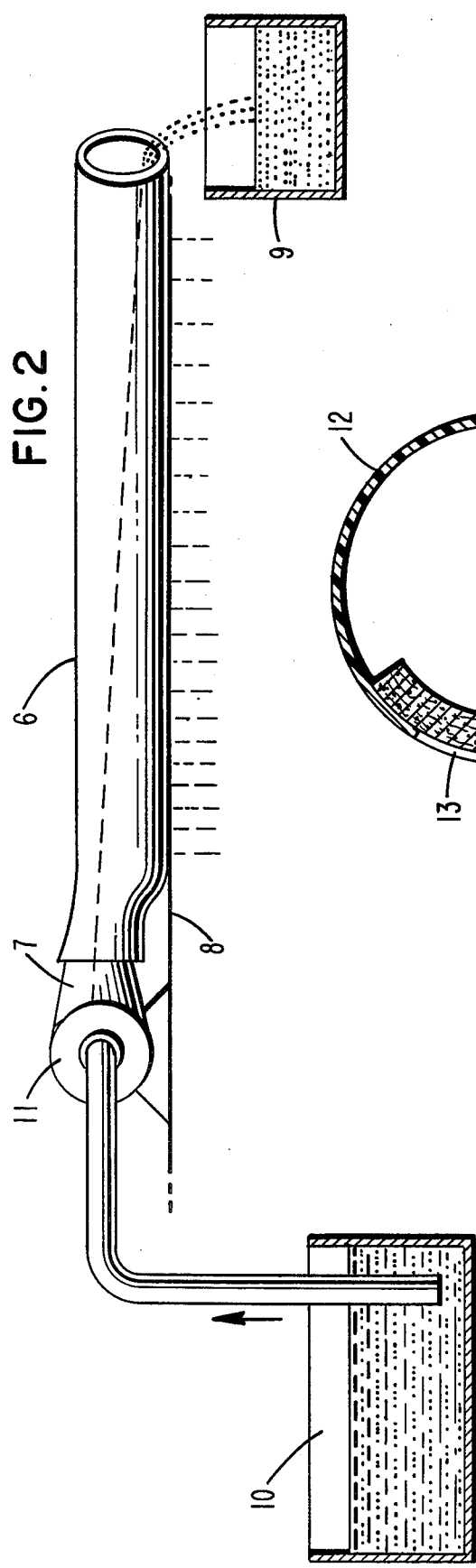
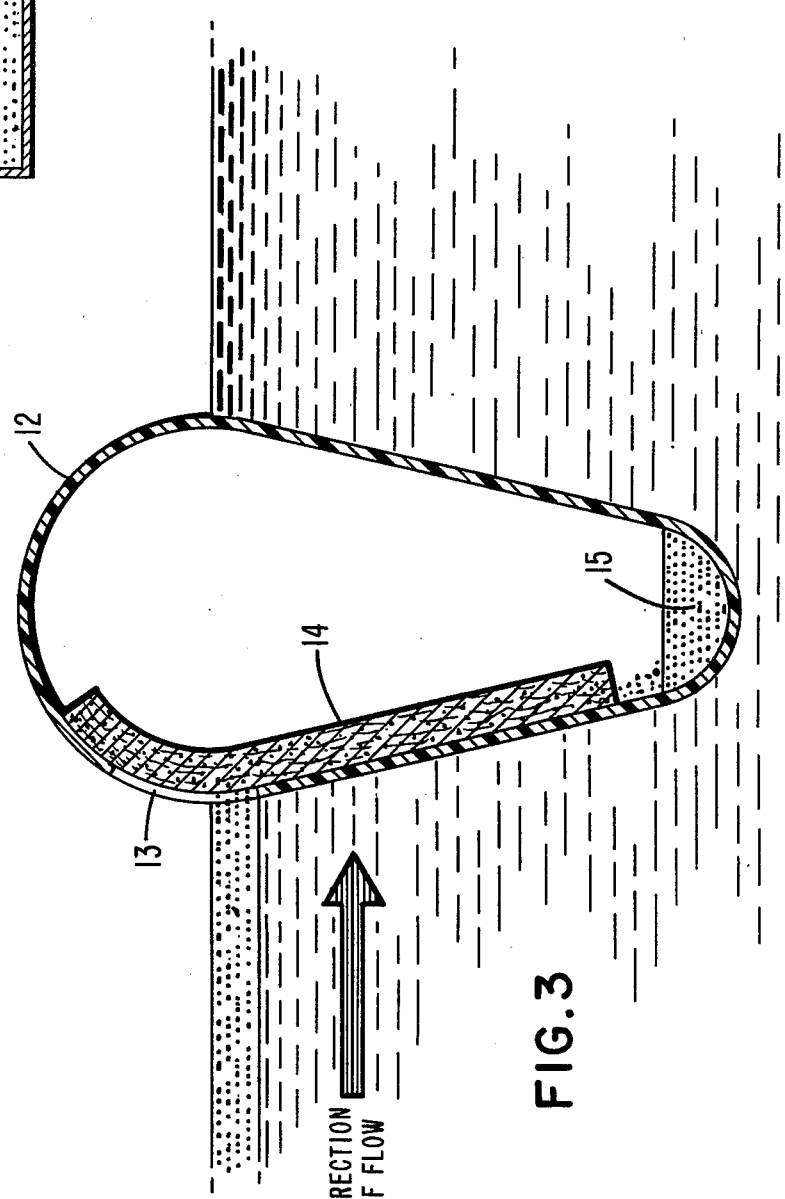

PROCESS AND APPARATUS FOR THE SEPARATION OF IMMISCIBLE LIQUID MIXTURES

This application is a continuation of application Ser. No. 107,956, filed Dec. 28, 1979, which in turn is a continuation of application Ser. No. 870,257, filed Jan. 17, 1978, both now abandoned.

The separation of mixtures of liquid, especially of water and oily liquids, continues to gain in importance for reasons of pollution control. Many processes, devices and means have been developed and used to some extent successfully, but they were generally quite unwieldy, especially when the separated liquids were to be recycled.

To separate oil/water mixtures, extensive use is made of means which absorb oil floating on water. The absorbents are in most cases hydrophobic, porous particles, e.g., pumice, rock dust, silica gel or cellulose. In many cases, they retain the absorbed oil so that it is incompletely or not recoverable by squeezing. Furthermore, some of the cited agents produce considerable dust when spread out. Moreover, collecting the oil-soaked material presents serious difficulties. To alleviate the drawbacks, the absorbents have been used packed in hoses, nets or cushions. While this facilitates handling, regeneration remains as difficult as before.

Another development in this area has been the use of oil absorbent fiber nonwovens. Such nonwovens are not only easy to handle, but oil can be readily recovered from them. These hydrophobic fiber nonwovens can be applied to the liquid mixture and, once they have become soaked with oil, the latter can be extracted by compression or centrifuging. Depending on the type and quality of the nonwovens, this procedure can be repeated from 30 to 50 times.

Using fiber nonwovens to absorb oil out of mixtures with water also allows continuous operation, for instance, by guiding and transporting a continuous belt made of such nonwoven via a system of rolls so that at one point it continuously takes up oil, whereas at the other point it travels through squeeze rolls or the like. The oil is then collected in a tank (Egbers, Ehrler and Janitza, Lenz. Ber. 40 (1976) 256). Although this system represents a substantial improvement, it still has a number of drawbacks. For instance, the continuous presence of a device transporting the nonwoven and means to squeeze out the oil and required. The resulting relatively large bulk of the systems interferes with their general use, for example, they cannot be used where oil must be removed from a stream running through pathless territory.

Furthermore, squeezing yields an emulsion of oil and water, since it is unavoidable that certain quantities of water are carried with the nonwoven into the squeezing unit. Therefore, separation of entrained water from the oil requires one additional processing step.

The life and performance of the oil absorbing fiber nonwovens is sharply limited by repeated squeezing or centrifuging.

The objective of the invention is to provide a process and devices making possible continuous separation of mixtures of liquid insoluble in each other, which is much easier to handle and is not subject to above-described drawback. Moreover, the separation quality is improved.

This objective is met in that a liquid mixture is brought into contact, under static liquid pressure, without the additional application of pressure, with one side of a sheet structure composed of staple fibers or filaments permeable to only one of the liquids, whereby one of the liquids passes through the sheet structure, and the liquids are collected and/or drained out separately.

The sheet structure to be used may consist of various materials such as staple fiber nonwovens, woven fabrics, knitted fabrics, and even unsized paper, provided they meet the requirements of being permeable to only one of the liquids to be separated. Of course, these sheet structures must also possess sufficient strength and dimensional stability for the end uses for which they are intended. Generally, these conditions are best met by stable fiber nonwovens, including needled fleeces. Nonwovens, woven and knitted fabrics of various staple fibers or filament yarns may be used.

Excellent results are obtained with special paper machine nonwovens composed of a mixture of 0–80% wt.% viscose fibers, 0–90wt.% synthetic fibers including at least 50 wt.% fibers having a high shrinkage capacity of at least 25%, 5–50% wt.% bonding fibers and 0–50% wt.% cellulose, compacted by thermal treatment of the wet nonwovens. Nonwovens composed of a mixture of 0 to 80 wt.% viscose fibers, 5 to 90 wt.% synthetic fibers, including at least 50% wt.% of fibers having a high shrinkage capacity of at least 25%, 5 to 25 wt.% bonding fibers and 0 to 50 wt.% cellulose are preferred.

In a more preferred embodiment, synthetic fibers comprise at least 50 wt.% of the nonwoven, since the nonshrinking fiber, e.g., nylon 6, provides a supporting network for the nonwoven and the high shrinkage copolymer provides bulk and absorbing capacity. The viscose or rayon fibers and cellulose, used in the form of pulp, can be regarded as fillers, since they are generally less expensive, and may be dispensed with if desired. However, if treated with a hydrophobing agent, both of the latter materials may be used to separate immiscible liquids as contemplated by the invention.

The synthetic fibers may be any of the known textile fibers, for instance, polyamide, polyester, polyacrylonitrile, polyolefin, etc., whereby the high shrinkage constituent can, for instance, be fibers produced in a known manner by spinning of the polymers at a high draw off from the spinneret. Preferably, however, use is made in the blend of high shrinkage fibers of a copolyamide of 20% nylon salt and 80% caprolactam. The bonding fibers are primarily copolyamide fibers of 40% nylon salt and 60% caprolactam, which soften or melt in the presence of water at relatively low temperatures.

In the case of needed fleeces, the above compositions can also be used without the necessity for including the bonding fibers.

The preferred fiber nonwovens are produced in a known manner by depositing the fiber blend on a Foundrinier screen, by heat treatment of the wet nonwoven, whereby the shrinkage of the fiber is developed while the bonding fiber is softened, resulting in a sheet structure of high dimensional stability, whose thickness and density is readily optionally varied to meet requirements. A process for the manufacture of such fiber nonwovens is described in greater detail in U.S. Pat. No. 3,394,047. The advantage offered by such paper machine nonwovens over other sheet structures can be seen especially in the fact that the fibers are aligned in relatively dense cohesion essentially parallel to the nonwoven plane and in that the porosity of the material is very uniform.

To carry out the process of the invention, it is essential that under operating conditions the sheet strucutres used by permeable to only one of the liquids. Permeability is tested according to DIN standards 53 886. Five circular specimens of a diameter of about 130 mm, are cut out and mounted under tension on a testing apparatus on which a graduated standing pipe is placed. The liquid is then filled at a rate of 10 cm./min. and the level on the column at which the first drop of liquid passes is read. A material is considered impermeable to a liquid, which at a column height corresponding to the static pressure at which the liquid impacts on the sheet structure under practical applications of the process, does not pass the liquid within 2 hours. It has been determined in a great many experiments that, when this requirement is met, there is no change in the impermeability even after extended time, e.g., up to 1 month.

A sheet structure is considered permeable to a liquid, when such liquid under operating conditions, i.e., under the static pressure exerted by such liquids on the sheet structure passes through.

To determine the performance of the material, 5 specimens are tested and the results averaged.

Generally, sheet structures will be used which per se are impermeable to one of the liquids to be separated, either because they are composed of fibers which cannot be wetted by the liquid in question, or because the sheet structure has been treated with a suitable finish before use. If the objective is, for example, to allow passage of oil while inhibiting passage of water, the sheet structure can be impregnated with commercial hydrophobing agents to prevent water from passing.

Surprisingly, it is also possible to use sheet structures which, when tested as described above, are permeable to both liquids, but become impermeable to one liquid if they are impregnated with the other liquid before use. In this case, the permeability measurement is performed with a previously soaked sheet structure. For instance, a sheet structure which in the "dry" stage is permeable both to water and oil can be first impregnated with water to make it impermeable to oil. For long-term use, it is, of course, necessary that the materials never dry out.

The utilization of such pretreated sheet structures, however, is limited, since they cannot be used in all devices suitable to carry out the process of the invention.

The process will essentially be used to separate water and other, especially oily, liquids. Tests have shown that the separation of mixtures of water and mineral oils (machine oil, diesel fuel, spindle oil) can be carried out very satisfactorily according to the invention. It is also similarly possible to separate table oils, turpentine oils, carbon disulfide, carbon tetrachloride and silicone oils from water. Glycol and benzene can also be very satisfactorily separated. The process is, however, not limited to the separation of the cited liquid mixtures.

The liquid mixtures need not necessarily be present as layered phases. The process can also be applied when one of the liquids is distributed in the form of droplets in the other liquid. To be sure, separation of these mixtures is more time consuming.

A variety of devices that can be adapted to the separation problems at hand may be used to carry out the process of the invention. These devices assume various forms, depending on the type of liquid mixture and the manner in which it is brought to the separation unit. Some designs proved to be eminently suitable, as will shortly appear.

According to the invention, a suitable apparatus may consist of a sheet structure permeable to only one of the liquids to be separated, said sheet structure assuming a gradient from the feed point for the liquid mixture to the collecting point for the nonpassing liquid, as well as a collecting system for the liquid passing through the sheet structure.

One embodiment of such setup is shown in FIG. 1. It consists of a screen 1 supporting sheet structure 2, a lead-in 3 for the liquid mixture and collecting tanks 4 and 5, respectively, for the separated liquids. As can be seen, screen 1 and sheet structure 2 on said screen assume a certain angle with respect to the horizontal. Accordingly, as the slope is steeper or shallower, the working efficiency is affected and can be selected as a function of the type and consistency of the liquid mixture. Optimum conditions are readily established by means of simple tests. An angle between 1° and 10° with respect to the horizontal will generally be selected.

It is, of course, also possible to have the sheet structure set up in a different way, e.g., stretched in a frame. It may also be expedient to have instead of the illustrated flat sheet structure an open or closed duct structure of optional cross section.

This embodiment of the process of the invention is illustrated in FIG. 2. It consists of a tubular or pipe element 6 formed of a suitable sheet material, a lead-in for the liquid mixture 7 and collecting tanks or discharge system 8 and 9, respectively, for the separated liquids. This setup works identically to that previously described. Here, too, the pipe can be given a certain slope, but this feature can also be omitted, since a liquid gradient is automatically created within the pipe from the feed point to the discharge point. In the illustrated version, chamber 10 from which the liquid mixture is pumped by pump 11 to the pipe, is a bath trough. This embodiment can be successfully used, for example, to remove oil-water mixtures from basements, etc. The liquid mixtures can be pumped up into a pipe consisting of a hydrophilic, oleophobic hose, laid out on the ground. The water is allowed to seep into the ground, whereas the oil in the hose flows into a collecting tank.

Another embodiment with which the principle of the process according to the invention can be realized and which is eminently suitable as oil barrier, is shown in FIG. 3. The setup consists of a hose or tubular structure 12 aligned across the direction of flow of the liquid stream and provided over at least a major portion of the entire length thereof, and preferably over substantially the entire length thereof, with a discontinuous slit 13 beginning above the liquid surface and of a width dimensioned in such a manner that said slit may be positioned to extend from above the liquid surface to below the contamination boundary, said slit being closed off by a sheet structure 14 permeable to only one of the liquids; furthermore, a collecting chamber 15 for the liquid being passed is provided within hose 12. A hose of this type can be stretched across a stream to provide an oil barrier in such a manner that it is submerged sufficiently in the flowing layer of contamination, e.g., an oil spill, so the latter comes in contact with the cut out section formed by a sheet structure permeable to oil. The oil floating on the water collects before the hose, penetrating inside said hose, and can then be withdrawn from both ends of said hose. The oil-free water flows on below the barrier.

The hose may consist of any suitable material impermeable to liquids, for example, plastic. But the hose material itself may be permeable to only one liquid. To stabilize the oil barrier in the liquid stream, use is made of conventional floats and moorings, e.g., an air hose within the oil barrier and an anchor keeping the oil barrier in place. The process and devices for practicing the invention are explained in further detail by the following examples:

EXAMPLE 1

A nonwoven material of 1 m. length and 40 cm. width, as shown in FIG. 1, is clamped in a frame at an angle of 3° from the horizontal. A few transverse bars are located as supports under the nonwoven and act simultaneously as current breakers.

The nonwoven material was produced by a conventional process on a paper machine from a fiber blend consisting of 15 wt.% viscose fiber, 25 wt.% polyamide fiber (nylon 6), 25 wt.% copolyamide fiber of 20% nylon salt and 80% caprolactam (shrinkage capacity in the presence of water 50%), 15 wt.% copolyamide fiber of 40% nylon salt and 60% caprolactam (ponding fibrer) and with addition of 20 wt.% cellulose. After the fiber blend was deposited on a Foudrinier screen, the wet nonwoven travelled through an IR radiation zone where the effect of heat resulted in shrinkage, and fusion of the bonding fiber increased to cohesion.

The nonwoven material had a thickness of 2.2 mm. and an apparent density of 0.16 g./cc. When dry, the nonwoven material was permeable both to water and diesel fuel. To prepare for the separation process, the nonwoven was first permeated with water. In determining the permeability of the wet nonwoven, it was noted that water passed immediately, while diesel fuel was held back up to a column height of 6 cm. over a period of 2 hours.

A mixture of water and diesel fuel (volumetric ratio 1:1) was pumped at a rate of 5 l./min. onto the nonwoven. The water passed through the nonwoven, while the diesel fuel ran down the surface of said nonwoven and was collected separately. It was found that the water contained less than 0.1% diesel fuel; the separated diesel fuel contained about 4–6% water. In continuous operation, there was no decline in the separation effect over a period of three days. This was also true, if after interrupting the separation process, the nonwoven was kept continuously wet.

Contamination of the oil/water mixtures, e.g., dispersed solids, produce an increase in the water content of the oil, but not an increase in the oil content of the water—a feature which is quite significant, especially in the decontamination of water.

The process can be used with equally favorable results in separating mixtures of water-carbon disulfide, water-tetrachloromethane and water-gasoline, provided nonwovens previously impregnated with water are used.

EXAMPLE 2

A nonwoven of the same type and composition as described in Example 1 was sewn to a 1 m. long hose of a diameter of some 15 cm., which was then placed on a horizontal metal screen (see FIG. 2). The hose was then permeated with water. Subsequently, a mixture of water and diesel fuel (volumetric ratio 1:1:) was pumped in at a rate of 5 l./min. The water flowed through the bottom of the hose onto the ground, while the diesel fuel within the hose ran because of the flow gradient, into a collecting vessel positioned below the lower end of the hose. The separating performance was equal to that described in Example 1.

While the set up according to this example offers no advantages over the set up in Example 1 in terms of separating performance, it does so in terms of handling, since on the one hand a framework is required for the system including a sheet-like nonwoven, and since on the other hand conversion to a larger throughput is not readily accomplished. With a hose, higher throughputs can be achieved simply by cutting off a greater length of hose from a supply roll and laying it out on the ground.

When the hose is made up of a water impregnated cotton fabric (plain weave) weighing 108 g./m$^2$., the separating performance for the same throughput declines slightly inasmuch as it was found that the oil recovered in this manner contains almost twice as much water than with a nonwoven hose (see above).

EXAMPLE 3

A nonwoven according to Example 1 was treated with 5.8 wt.% of a hydrophobic agent consisting of a zirconium salt-containing, emulsifier-free, paraffin emulsion, available commercially as APRANAL ZA. The permeability test indicates that the nonwoven is absolutely impermeable to water, whereas oil is immediately absorbed and allowed to pass.

An 8 cm. wide strip of the nonwoven was sewn to the entire length of a PVC hose. Diameter of the hose was 10 cm. For the experiment simulating an oil barrier, it was placed in a box, 20×20 cm$^2$. containing 15 cm. of water so that the water level reached approximately to the middle of the cut-out nonwoven section (see FIG. 3). An oil/water mixture was added drop by drop on one side of this barrier; on the other side, water was siphoned off as soon as the level exceeded 15 cm. The oil was able to flow off through a hole in the box in which the end of the hose was inserted.

Subsequently, a mixture of diesel fuel/water (volumetric ratio 1:1) was supplied so that the oil layer in front of the oil barrier measured 2 mm. At a water temperature of 23° C. some 2 l. oil/hour drained off through the hose. With an oil layer of 10 mm., drainage was 6 l. oil/hour and with an oil layer of 20 mm. thickness, 14 l. oil/hour were drained off. At a water temperature of 5° C., throughput dropped to nearly half; at 50° C., it increased by 25%.

Throughput of the pure oil/water mixture was absolutely constant over the testing period of 8 hours, thus it can be assumed that over longer periods of time there will be no reduction in throughput. However, when the oil/water mixture contains impurities, depending on type and quantity of such impurities, the throughput decreases more or less with time. Separating performance is not impaired.

Comparison of the process of the invention as outlined in this example with the known method of floating an oil-absorbent nonwoven on the oil/water mixture, with subsequent oil extraction, discloses that during an 8-hour testing period, ten times as much oil/cm$^2$. of nonwoven is separated as by the known method. The separation quality is exceptional with this process. Neither the water nor the oil contains any traces of the other liquid after separation.

EXAMPLE 4

Example 3 was duplicated with a nonwoven of the same composition and density, but of a thickness of 3.4 mm. In addition, the hydrophobic agent constituent was 5.5 wt.%. With an oil layer of 10 mm. above the water and a water temperature of 23° C., 3.5 l. oil/hour were separated.

EXAMPLE 5

The procedure outlined in Example 4 was followed using a nonwoven composed of:

15 wt.% viscose fibers;
20 wt.% polyamide fibers (nylon 6);
50 wt.% copolyamide fibers of 20% nylon salt and 80% caprolactam (shrinkage 50%);
15 wt.% copolyamide fibers of 40% nylon salt and 60% caprolactam (bonding fiber).

The thickness of the nonwoven was 2.3 mm. and the apparent density 0.13 g./cm$^3$. The hydrophobic agent level was 5.6%. Under the testing condition of Example 4, a throughput of 9 l. oil/hour was measured.

EXAMPLE 6

Example 3 was duplicated using a mixture of oil/water (1:1), which had been made into a milky emulsion by vigorous stirring. While the throughput is drastically reduced when this mixture is poured in front of the oil barrier, the separation quality remains unimpaired.

EXAMPLE 7

Example 3 was duplicated with other oil/water mixtures. Identical testing conditions were maintained (oil layer 10 mm., temperature 23° C.) and in all instances a total separation of oils from water was achieved. However, there were throughput variations. The following separations were achieved:

17 l. turpentine oil,
6 l. diesel fuel,
3 l. silicone oil,
1 l. spindle oil,
0.4 l. table oil.

It is possible within the scope of the invention, by proper selection of the type and composition of the nonwoven, as above described, to conform to the mixture to be separated in such a manner that complete separation of the liquid mixture is combined with optimum throughput.

What is claimed is:

1. A process for the separation of mixtures of liquids insoluble in each other by means of nonwoven fibrous sheet structures, comprising bringing the mixture of liquids into contact, under static liquid pressure, without additional pressure, with one side of a sheet structure comprising fibers or filaments permeable to only one of the liquids and nonpermeable to said other liquid, wherein said nonwoven sheet structure is produced on a paper machine and said nonwoven is composed of a blend of 15 wt. % viscous fibers, 25 wt. % nylon 6 fibers, 25 wt. % of fibers of a copolyamide of 20% nylon salt and 80% caprolactam having a shrinkage capacity of at least 25%, 15 wt. % bonding fibers and 20 wt. % cellulose fibers and consolidated by thermal treatment of the wet nonwoven, whereby said permeable liquid passes through the sheet structure and said nonpermeable liquid is prevented from passing through said sheet structure and collecting the liquids separately.

2. A process for the separation of mixtures of liquids insoluble in each other by means of nonwoven fibrous sheet structures, comprising bringing the mixtures of liquids into contact, under static liquid pressure, without additional pressure, with one side of a sheet structure comprising fibers or filaments permeable to only one of the liquids and nonpermeable to said other liquid, wherein the nonwoven sheet structure is produced on a paper machine, and said nonwoven is composed of a blend of 15 wt. % viscose fiber, 20 wt. % nylon 6 fiber, 50 wt. % of a fiber of copolyamide of 20% nylon salt and 80% caprolactam having a shrinkage capacity of at least 25%, and 15 wt. % bonding fiber and consolidated by thermal treatment of the wet nonwoven, whereby said permeable liquid is prevented from passing through said sheet structure and collecting the liquids separately.

* * * * *